US012676840B2

(12) United States Patent
Haber et al.

(10) Patent No.: US 12,676,840 B2
(45) Date of Patent: *Jul. 7, 2026

(54) SYSTEMS AND METHODS FOR FACILITATING A DOUBLE-LAYER RESTRICTION SUBNET ARCHITECTURE USING SUBNET SPECIFIC RESTRICTIONS WITHIN DATA STREAMED USING HIERARCHICAL SUBNET RESTRICTIONS

(71) Applicant: Citigroup Technology, Inc., New York, NY (US)

(72) Inventors: Aharon Baruch Haber, Tel Aviv (IL); Shobhit Maini, London (GB); Haiping Choo, Marina Bay (SG)

(73) Assignee: Citigroup Technology, Inc., New York, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/784,358

(22) Filed: Jul. 25, 2024

(65) Prior Publication Data

US 2025/0150441 A1     May 8, 2025

Related U.S. Application Data

(63) Continuation of application No. 18/501,573, filed on Nov. 3, 2023, now Pat. No. 12,081,532.

(51) Int. Cl.
H04L 9/40          (2022.01)
H04L 9/00          (2022.01)

(52) U.S. Cl.
CPC ................. *H04L 63/06* (2013.01); *H04L 9/50* (2022.05); *H04L 63/0428* (2013.01)

(58) Field of Classification Search
None
See application file for complete search history.

(56) References Cited

U.S. PATENT DOCUMENTS

2019/0349733 A1* 11/2019 Nolan ..................... H04L 45/20
2020/0118068 A1*  4/2020 Turetsky ............... H04L 63/123

* cited by examiner

*Primary Examiner* — Brandon Hoffman
(74) *Attorney, Agent, or Firm* — Foley & Lardner LLP

(57) ABSTRACT

Systems and methods for uses and/or improvements to blockchain and blockchain technology, particularly to provide a scalable solution to the aforementioned security and privacy concerns. As one example, systems and methods are described herein for a double-layer restriction subnet architecture that overcomes the technical limitations of conventional blockchains, whether public or permissioned, and subnets thereof. The double-layer restriction subnet architecture comprises a series of permissioned subnets, which provides both the security/privacy benefits of permissioned blockchains but also the scalability of subnet efficiency.

20 Claims, 6 Drawing Sheets

<u>400</u>

300

310

320

315

325

330

340

400

Generate, from a first subnet, a first data stream

402

Transmit, by the first subnet, a first message in the first data stream

404

Receive, at the first subnet, a second message from the second subnet

406

Transmit, by the first subnet, a third message in the first data stream

408

SYSTEMS AND METHODS FOR FACILITATING A DOUBLE-LAYER RESTRICTION SUBNET ARCHITECTURE USING SUBNET SPECIFIC RESTRICTIONS WITHIN DATA STREAMED USING HIERARCHICAL SUBNET RESTRICTIONS

CROSS-REFERENCE TO RELATED APPLICATION(S)

This application is a continuation of U.S. Pat. No. 12,081,532, filed Nov. 3, 2023, and issued on Sep. 3, 2024. The content of the foregoing application is incorporated herein in its entirety by reference.

BACKGROUND

With the rise in electronic communications and the diverse types of actions that are now performed by electronic communications, the threat of adverse or unauthorized parties accessing electronic communications has also risen. To combat this threat, electronic communications frequently use some form of encryption and/or cryptographic security to thwart these adverse or unauthorized parties. One such type of cryptographic security is provided by blockchains and blockchain technology.

A blockchain is a decentralized ledger of transactions built upon a combination of cryptography techniques (e.g., secret keys, hash functions, etc.), consensus mechanisms (e.g., proof of work, proof of stake, etc.), and computer networks (e.g., peer-to-peer ("P2P") networks, the Internet, etc.). The blockchain stores information electronically, grouped together into a series of subsets of the information called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the relative immutability of the records, the blockchain does not necessarily require a central authority to monitor transactions, maintain records, and/or enforce rules. As such, blockchains and blockchain technology have become a foundation of what may be described as a next generation compute platform, particularly when enhanced with self-executing programs (e.g., "smart contracts"). These self-executing programs are stored on a blockchain and run when predetermined conditions are met.

Despite the technological breakthrough that blockchains and blockchain technology represent, practical implementations of blockchain technology have been hindered by several technical problems. For example, the predetermined conditions and resulting actions from the execution of the self-executing programs are, in fact, encoded into them and cannot be changed after they are published to a blockchain. This raises serious security concerns because they can then be analyzed for flaws to be used for malicious attacks. These security concerns, in turn, present challenges to integrating blockchain technology into traditional, centralized software infrastructures. Similarly, information posted to a blockchain becomes public, which can lead to privacy concerns.

SUMMARY

Systems and methods are described herein for novel uses and/or improvements to blockchain and blockchain technology, particularly to provide a scalable solution to the aforementioned security and privacy concerns. As one example, systems and methods are described herein for a double-layer restriction subnet architecture that overcomes the technical limitations of conventional blockchains, whether public or permissioned, and subnets thereof.

For example, one potential solution to the aforementioned security and privacy concerns is through the use of permissioned blockchain networks. A permissioned blockchain is a type of blockchain network in which access to participate in the network and perform certain actions, such as validating transactions or adding new blocks, is restricted to a select group of participants or entities. Unlike public blockchains, where anyone can join the network and participate in the consensus process, permissioned blockchains are more controlled and have predefined rules governing access. However, these predefined rules and governed access cut against the fundamental openness of blockchain technology, as new entrants must meet the permission requirements. Moreover, blockchain networks can become congested as the number of users and transactions increases, leading to scalability issues, and a permissioned blockchain faces the same scalability issues as the number of entrants increases.

As an alternative solution to a permissioned blockchain, another potential solution is the use of a subnet. A blockchain subnet may be a secondary blockchain within a larger blockchain network. The primary purpose of a blockchain subnet is to improve the scalability and efficiency of a blockchain system by dividing the workload among multiple subchains. Each subnet operates independently but is still connected to the main blockchain network. However, subnets inherit the security and privacy properties of the main blockchain network. This can include using the main chain's consensus mechanism (e.g., proof of stake) or security features to maintain the integrity of the subnets. Accordingly, issues with security or privacy in a blockchain network are also present in the subnet.

In view of the limitations of the proposed solutions, the systems and methods use a double-layer restriction subnet architecture. In particular, the double-layer restriction subnet architecture comprises a series of permissioned subnets, which provides both the security/privacy benefits of permissioned blockchains but also the scalability of subnet efficiency. However, a series of permissioned subnets also creates a novel technical problem in that as the series of permissioned subnets grows due to its increased scalability, the inputs/outputs to a subnet higher in the hierarchy of the subnet architecture may be viewable by each subnet lower in the hierarchy of the subnet architecture. While such an issue may not cause a problem in the conventional subnets with low scalability, this could introduce a novel security/privacy issue for the improved subnet architecture as it grows in size.

Accordingly, the system may use additional encryption (e.g., a second layer restriction) beyond the initial permissioned blockchain (e.g., first layer restriction). That is, while the system may stream data from a first subnet, in which the streamed data comprises a first restriction, the system may use additional restrictions/encryptions within that streamed data to provide additional security/privacy for messages that are specific to a given subnet (e.g., the messages may be further encrypted specifically for the given subnet). By doing so, other subnets at the same level of the subnet hierarchy cannot interpret data shared with the given subnet. While such an approach would not be possible in a conventional blockchain, the use of subnets (e.g., with the subnet specific rules) allows for such an advantage as well as allowing the subnets higher in the hierarchy to monitor transactions, maintain records, and/or enforce rules. As yet another additional benefit, which also would not be possible with a conventional blockchain, other subnets at the same level of the subnet hierarchy can still view that data was shared to/by a given subnet (e.g., in order to ensure consistency in the digital ledger) but are not able decrypt the data (e.g., interpret what the data states). That is, the other subnets may observe that a blockchain action occurred, but other subnets are not able to determine what the action was (e.g., further improving security/privacy).

For example, the additional layers of restrictions may enable a system in which different entity types (e.g., requestor entities, supplier entities, and external entities) have different level of access. Each entity type only has access to the limited data that pertains to their role. As such, external entities do not have access to any data. Requestor entities have access only to their own requests. Supplier entities have access to only the data they have supplied and whether the supplied data responses were accepted. By doing so, the system provides varying levels of privacy/security distinct from conventional blockchains and/or decentralized applications while providing the technical benefits of blockchains and/or decentralized applications.

In some aspects, systems and methods for facilitating double-layer restriction subnet architectures using subnet specific restrictions are described. For example, the system may establish a subnet hierarchy comprising a first subnet, a second subnet, and a third subnet, wherein the first subnet is located at a first level of the subnet hierarchy, wherein the second subnet and the third subnet are located at a second level of the subnet hierarchy, wherein the first subnet streams a first data stream that is subject to a first data restriction to the second subnet and the third subnet, and wherein the first data stream is interpretable to subnets located at the second level. The system may simultaneously stream, by the first subnet, a first message in the first data stream to the second subnet and the third subnet. The system may receive, at the first subnet, a second message from the second subnet, wherein the second message is subject to a second data restriction, wherein the second message is interpretable by the first subnet. The system may simultaneously stream, by the first subnet, a third message in the first data stream to the second subnet and the third subnet, wherein the third message is further subject to the second data restriction, wherein the third message is interpretable by the second subnet, and wherein the third message is not interpretable by the third subnet.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention. For example, the additional layers of restrictions may enable a system in which different entity types (e.g., requestor entities, supplier entities, and external entities) have different level of access. Each entity type only has access to the limited data that pertains to their role. As such, external entities do not have access to any data. Requestor entities have access only to their own requests. Supplier entities have access to only the data they have supplied and whether the supplied data responses were accepted.

Figure 1A:
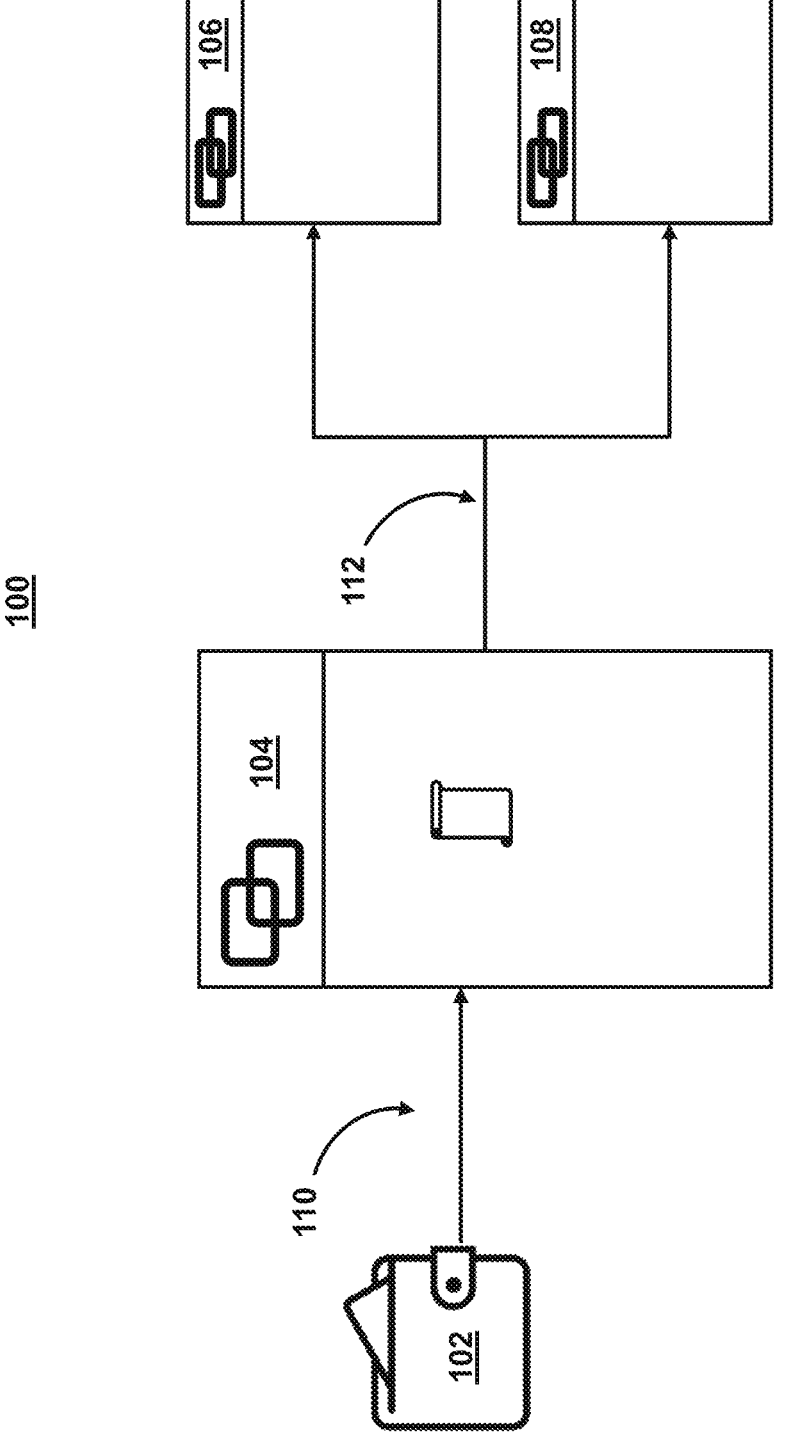
FIGS. 1A-C show illustrative diagrams for facilitating double-layer restriction subnet architectures using subnet specific restrictions, in accordance with one or more embodiments.
Figure 1B:
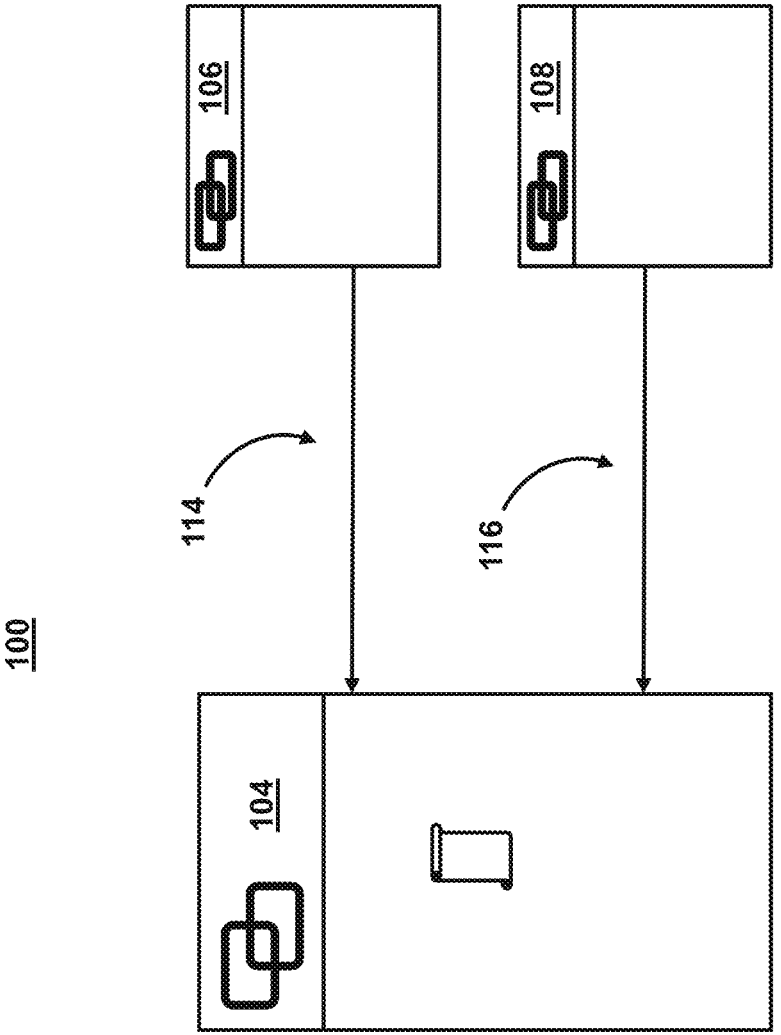
Figure 1B:
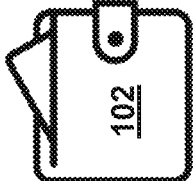
Figure 1C:
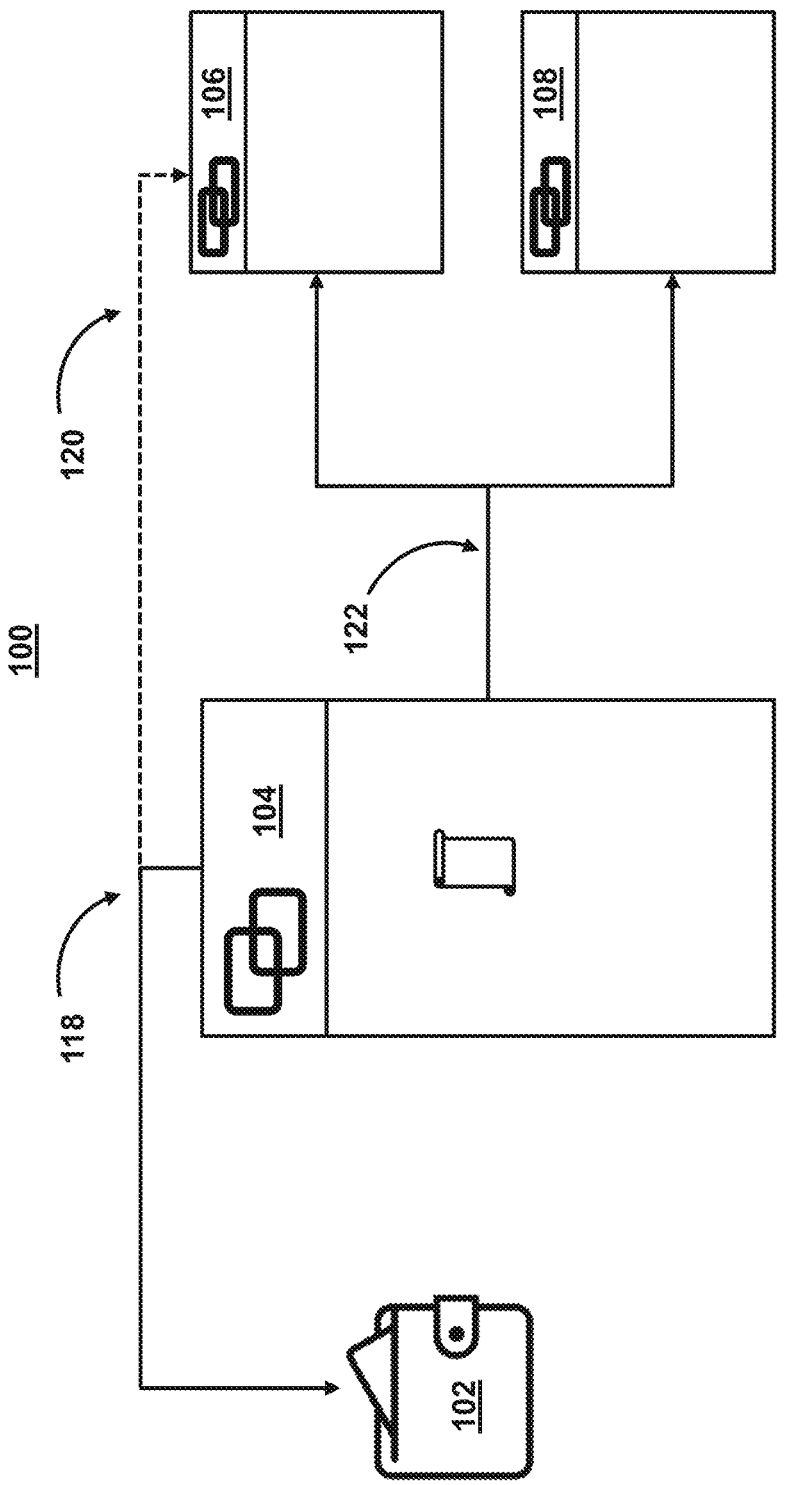

FIGS. 1A-C show illustrative diagrams for facilitating double-layer restriction subnet architectures using subnet specific restrictions, in accordance with one or more embodiments. For example, FIG. 1A shows system 100. System 100 may comprise a plurality of components, such as client account 102. Client account 102 may transmit a request for a blockchain action (e.g., request 110) to subnet 104. Subnet 104 may establish a subnet hierarchy with subnet 106 and subnet 108. For example, system 100 may establish a subnet hierarchy comprising a first subnet (e.g., corresponding to a supplier entity), a second subnet (e.g., corresponding to a requestor entity), and a third subnet (e.g., corresponding to a different requestor entity), wherein the first subnet is located at a first level of the subnet hierarchy, wherein the second subnet and the third subnet are located at a second level of the subnet hierarchy, wherein the first subnet streams a first data stream that is subject to a first data restriction to the second subnet and the third subnet, and wherein first data stream is interpretable to subnets located at the second level. Notably, system 100 prevents other entities (e.g., an external entity) that is not authorized to access subnet 104 from accessing system 100. It should be noted that these other entities are not shown for simplicity. Additionally or alternatively, system 100 may comprise a single subnet (e.g., subnet 104) that is accessible from a plurality of entities (whether or not these entities comprise, and/or correspond to, a separate subnet). For example, subnet 104 may represents an application where all requesters may have access, but a given requestor may only access (or interpret) information related to their own requests. All other data (e.g., data related to other requestors) may be encrypted and/or otherwise inaccessible.

It should also be noted that system 100 may include one or more other subnets at each level of the hierarchy. For example, in some embodiments, subnet 104 may represent multiple subnets (e.g., corresponding to different suppliers) and/or subnet 104 may comprise a single subnet that corresponds to multiple suppliers.

As referred to herein, a subnet may comprise a partitioned segment of a network (e.g., a blockchain network) created to improve scalability. Each subnet could process a subset of blockchain actions, thereby distributing the network load and increasing throughput. For example, a subnet may comprise a set of nodes (or validators) collectively responsible for reaching consensus on the transactions associated with one or more blockchains. It can be thought of as a network inside a network or, alternatively, a network built on top of a larger one. In some embodiments, the subnet may be a customized blockchain network within a larger ecosystem. It might have its own consensus rules, token standards, and governance structures designed to cater to specific applications or industries. For example, each subnet may correspond to a given entity and/or be attributed to or controlled by that entity. In some embodiments, the subnet may be a representation of a set of interconnected blockchains within a network of interoperable chains. These subnets could enable the transfer of assets or data between them while maintaining distinct characteristics and functionalities. In some embodiments, the subnet may establish privacy zones within a larger blockchain network. These subnets could offer enhanced privacy features, such as confidential transactions or data compartmentalization, for specific users or use cases. In some embodiments, the subnet may be partitions of a blockchain network dedicated to resource management. For example, one subnet might focus on processing transactions, while another subnet could be dedicated to smart contract execution, optimizing resource allocation. In some embodiments, the subnet may correspond to a given consensus mechanism within a single blockchain network. For instance, one subnet might use proof of stake (PoS) consensus, while another might employ delegated proof of stake (DPoS).

It should be noted that embodiments involving subnets may also apply to embodiments using oracles. A blockchain oracle may comprise a third-party service or mechanism that provides external data to a blockchain and/or self-executing program thereon. Oracles act as bridges between the blockchain and external data sources. They collect data from various sources and then feed that data into smart contracts on the blockchain. This external data can trigger the execution of predefined actions or conditions in the smart contracts. Oracles essentially serve as a way to bring real-world information into the blockchain environment, making it possible for smart contracts to react to events and conditions that occur outside the blockchain. Oracles come in various forms, including software services provided by companies, decentralized networks, or even individuals who manually input data into a smart contract. The choice of oracle depends on factors like the reliability and trustworthiness required for a particular use case.

It should also be noted that embodiments involving subnets and/or oracles may also apply to embodiments using any blockchain network (e.g., whether or not these networks involve oracles or subnets). For example, as opposed to subnets and/or oracles, the embodiments may use sidechains, layer-2 solutions, state channels, off-chain scaling, multi-chain ecosystems, and/or hybrid approaches. Sidechains are separate blockchains that are interoperable with the main blockchain. They allow assets or data to be transferred back and forth between the main chain and sidechains, creating a scalable solution while maintaining the security of the main chain. Examples of projects using sidechains include RSK (for Bitcoin) and Loom Network.

Layer-2 solutions are protocols built on top of existing blockchains, aiming to increase scalability and reduce transaction costs. They include technologies like the Lightning Network for Bitcoin and state channels for Ethereum. These solutions move some of the transactions off-chain, reducing the load on the main blockchain. State channels are off-chain, bi-directional payment channels that allow multiple participants to transact with each other. They are typically used for microtransactions and can significantly increase transaction throughput and reduce fees. Some projects focus on entirely off-chain solutions for scalability. For instance, the Interledger Protocol (ILP) facilitates transactions across different blockchains and payment networks, acting as a protocol for connecting different payment systems. Additionally or alternatively, instead of relying on a single chain, some projects create multi-chain ecosystems where different chains serve different purposes. Polkadot and Cosmos are examples of platforms that aim to connect and interoperate between multiple blockchains.

In some embodiments, the subnet (or oracle) may also provide indexing services. For example, an indexer may be a software component that creates a structured, searchable index of the data (e.g., blockchain data) related to a subnet. The index may provide for quick and efficient retrieval of information, making it much faster to find specific transactions, addresses, or other data within the blockchain. The indexer examines each block and its contents, extracting relevant information such as transaction details, addresses, and more. The indexer, which may be included in a subnet (or oracle) may then organize this data into a format that is optimized for search and retrieval. The indexer may provide an Application Programming Interface (API) that allows entities to interact with the data more easily. This API may be used to build applications that require real-time blockchain data, such as wallets, explorers, and analytics tools. For example, an indexer may support a Request for Quote (RFQ) process. A RFQ is a procurement process used by entities to solicit quotations or bids from suppliers for the purchase of goods and/or services. It is a formal process that allows requestors to compare offers from different suppliers and make informed decisions on procurement.

A subnet hierarchy may refer to a subnet network architecture where multiple subnets are organized in a hierarchical or tree-like structure. This hierarchy is used to create a layered or structured system of subnets, each serving a specific purpose or function. The primary subnet at the top of the hierarchy is often referred to as the "main chain" or "parent chain," and it can have multiple child chains or subchains beneath it.

At the top of the hierarchy is the main subnet or main chain. This is the primary subnet that typically manages essential functions such as consensus, security, and overall network governance. It might contain only basic transaction data or may include additional features like smart contracts. Below the main chain, there are one or more child chains or subchains. These are secondary subnets that are connected to the main chain. Each child chain can have its own set of features, rules, and consensus mechanisms tailored to specific use cases or applications. They often offload some of the transaction processing from the main chain, enhancing scalability. The subnet hierarchies may be designed to allow interoperability between the main chain and its child chains. This means that assets, data, or even smart contracts can move between different chains within the hierarchy. Interoperability is a crucial feature that enables flexibility and cross-chain communication. One of the primary motivations for using a subnet hierarchy is scalability. By distributing transactions and smart contract processing across multiple child chains, the overall network can handle a higher throughput of transactions without overwhelming the main chain.

Subnet hierarchies may be employed in situations where different applications or use cases require their own dedicated chains but still need to interact with a shared main chain. This may be used in scenarios like gaming platforms, supply chain management, and/or decentralized finance (DeFi). While the main chain typically provides the highest level of security and consensus, child chains may use different consensus mechanisms tailored to their specific needs. These mechanisms could include PoS, DPoS, or others. The governance structure of a subnet hierarchy may involve both the main chain and individual child chains. Governance decisions can include changes to the protocol, upgrades, and the addition of new child chains. Token or asset management in a subnet hierarchy can be complex, as tokens may exist on different chains within the hierarchy. Cross-chain bridges or mechanisms are often used to facilitate the movement of tokens between chains.

In some embodiments, the subnet hierarchy may comprise multiple levels and/or a tree-like structure—for example, a first level (e.g., a parent level) and a second level (e.g., a child level). In a tree-like hierarchical structure, levels refer to the different tiers or layers within the hierarchy. Each level represents a distinct stage or depth of the structure, and nodes at a given level have a specific relationship with one another.

The levels in a tree-like structure are typically numbered starting from the root level, which is considered the highest level, and then increasing as the system moves down the hierarchy. The root node is the starting point of the hierarchy and is not connected to any other node in a parent-child relationship. The next level may comprise nodes (e.g., subnets) that are directly connected to the root node. These nodes are considered the first layer of children or subordinates of the root node. Nodes at the next level are one step removed from the root node and are considered the children or subordinates of nodes at that level. In a blockchain hierarchy, these nodes might be analogous to parent chains or intermediate layers. These nodes may represent child chains or subnets within a blockchain hierarchy.

In some embodiments, the system may subject data to different restrictions. These restrictions may include access restrictions and/or encryptions. For example, the restriction may include encrypting data on the blockchain, such as personal details, private keys, or confidential documents, from unauthorized access. To encrypt the data, the system may use off-chain encryption. For example, the system may encrypt the data before it is stored/streamed on the blockchain. This can be done using encryption algorithms such as AES (Advanced Encryption Standard) or RSA (Rivest-Shamir-Adleman). Only the encrypted data is stored on the blockchain, ensuring that even if someone gains access to the data, they cannot decipher it without the decryption key. The encryption keys may then be securely managed and stored off-chain.

In some embodiments, the restriction may include requirements to use private blockchains and/or subnets linked to a specific account. For example, in a private or permissioned blockchain, the system may have more control over access and can implement stronger encryption mechanisms. The system can manage encryption keys and access controls more effectively in such environments. In some embodiments, the system may use Zero-Knowledge Proofs. For example, the system may use cryptographic techniques to allow users to prove the validity of encrypted data without revealing the data itself. In some embodiments, the system may use sidechains. Sidechains are separate blockchains that are interoperable with the main blockchain. The system can store encrypted data on a sidechain and then reference it on the main chain, ensuring data privacy while still benefiting from the security and decentralization of the main chain. In some embodiments, the system may use off-chain storage. For example, the system may store sensitive data off-chain and only store references or hashes of the data on the blockchain. The blockchain can be used as a secure ledger to verify the integrity of the data without revealing its contents.

In some embodiments, the restriction may include access controls for permissioned blockchains and/or subnets. The system may use the access controls to regulate who can participate in the blockchain network, access streaming data, and/or use one or more subnets and what actions they can perform within the network.

In some embodiments, the restriction may be based on a whitelist. For example, only pre-approved participants or entities may be allowed to join the network by the system. The system may grant access based on a predefined whitelist of approved participants. In some embodiments, the system may use Know Your Customer (KYC) procedures. For example, the system may require participants to undergo KYC checks and verification before being granted access to the blockchain network.

In some embodiments, the system may require participants to use issued digital identities, such as cryptographic keys or certificates, which are used to authenticate and authorize them on the network. The system may also require multiple authorized signatures or approvals for specific actions, such as validating transactions or making changes to the blockchain. In some embodiments, the system may use role-based access control (RBAC). For example, the system may categorize participants into roles (e.g., validators, administrators, auditors) based on their responsibilities and permissions. Each role may be associated with a specific set of permissions or actions that members in that role can perform. Access controls are defined based on these roles and their associated permissions. For example, access to validating and confirming actions can be restricted to a select group of validators or nodes in the network. These validators are responsible for achieving consensus and maintaining the blockchain's integrity. Furthermore, these actions may be based on a level of a subnet hierarchy.

As shown in FIG. 1A, subnet 104 may simultaneously stream a first message (e.g., message 112) in a first data stream to subnet 106 and subnet 108. For example, subnet 104 may comprise an application that is hosted on a subnet, wherein only other entities/subnets that are authorized may access. The data on subnet 104 may enter subnet 104 encrypted (e.g., other than header data) with a key from a requestor. This ensures that only the specific requestor (e.g., corresponding to a specific subnet on a lower hierarchy) has access to data pertaining to the specific requests that the requestor submitted. This partitions data between requestors and ensures that no one else can see the data-even if they had access to subnet 104 and/or system 100.

In some embodiments, the system may stream blockchain data. A "blockchain stream" may refer to a continuous flow of data or information that is being recorded on a blockchain. Blockchains are often used to timestamp and securely store data, and this data may comprise a stream of regularly updated data or data added to the blockchain. In some embodiments, the stream may represent a sequence or series of blockchain actions. These actions may comprise a stream of data that records the movement of digital assets, smart contract executions, or other blockchain-related activities. In some embodiments, the system may stream services or platforms that utilize blockchain technology for various purposes. For example, there are blockchain-based platforms that reward content creators or streamers with cryptocurrency tokens for their contributions. In some embodiments, the system may provide APIs and tools to access blockchain data in real time, allowing developers and applications to stream blockchain information as it is confirmed in blocks. In some embodiments, the system may provide real-time data feeds or oracles that provide external information to smart contracts on a blockchain. These oracles may act as streams of data that smart contracts rely on for decision-making.

As shown in FIG. 1B, subnet 104 may receive messages from the other subnets in the hierarchy. For example, subnet 104 may receive a second message from subnet 106, wherein the second message is subject to a second data restriction, wherein the second message is interpretable by subnet 104 but not interpretable by subnet 108. For example, requests that are filled are further sent to the specific subnet (e.g., subnet 104) of the supplier—encrypted with the supplier's key. This ensures that only the supplier can see the encrypted data—even if some other entity hacked its way onto the subnet.

Subnet 104 may receive a message along communication pathways (e.g., pathway 114 and pathway 116) that is distinct from a data stream from one level of the hierarchy to another. For example, each subnet may have a private communication channel through which it may make private communications. The results of these private communications may then be published in the data stream. As shown in FIG. 1B, subnet 104 may receive a message via pathway 114 from subnet 106 and a message via pathway 116 from subnet 108. In each instance, a message transmitted may be subject to a data restriction that is specific to a given subnet. Subnet 104 may have a data restriction key that allows for subnet 104 to interpret content of the message.

For example, subnet 104 may populate a blockchain based on streamed data. Subnet 104 may simultaneously stream a third message in the first data stream to subnet 106 and subnet 108, wherein the third message is further subject to the second data restriction, wherein the third message is interpretable by the second subnet, and wherein the third message is not interpretable by subnet 108. In some embodiments, the system may ensure that data in the message is not interpretable to other subnets. For example, the data may not be interpretable because it has been transformed using encryption algorithms into a format that is intentionally designed to be unreadable and indecipherable without the proper decryption key.

The subnet hierarchy may communicate a plurality of messages, each of which comprises content. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc. In some embodiments, content may be displayed in a user interface. As referred to herein, a "user interface" may comprise a mechanism for human-computer interaction and communication in a device and may include display screens, keyboards, a mouse, and the appearance of a desktop.

As shown in FIG. 1C, in response to the second message, subnet 104 may simultaneously stream a third message (e.g., message 122) in the first data stream to the second subnet and the third subnet, wherein the third message is further subject to the second data restriction, wherein the third message is interpretable by the second subnet, and wherein the third message is not interpretable by the third subnet. For example, subnet 104 may send a response to the second message. The response may be included in the data stream such that all subnets may detect that a message was sent. However, the message may be subject to a data restriction such that only subnet 106 may interpret the content of the third message.

Subnet 104 may also perform a blockchain action based on the second message. The performance of the blockchain action may correspond to the content of the third message. For example, subnet 104 may execute blockchain action 118 with respect to client account 102. Additionally or alternatively, subnet 104 may transmit a message directly to subnet 106 along a communication pathway specific to subnet 106 (e.g., communication pathway 120).

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a self-executing program stored on a blockchain. For example, a self-executing program may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code.

Figure 2:
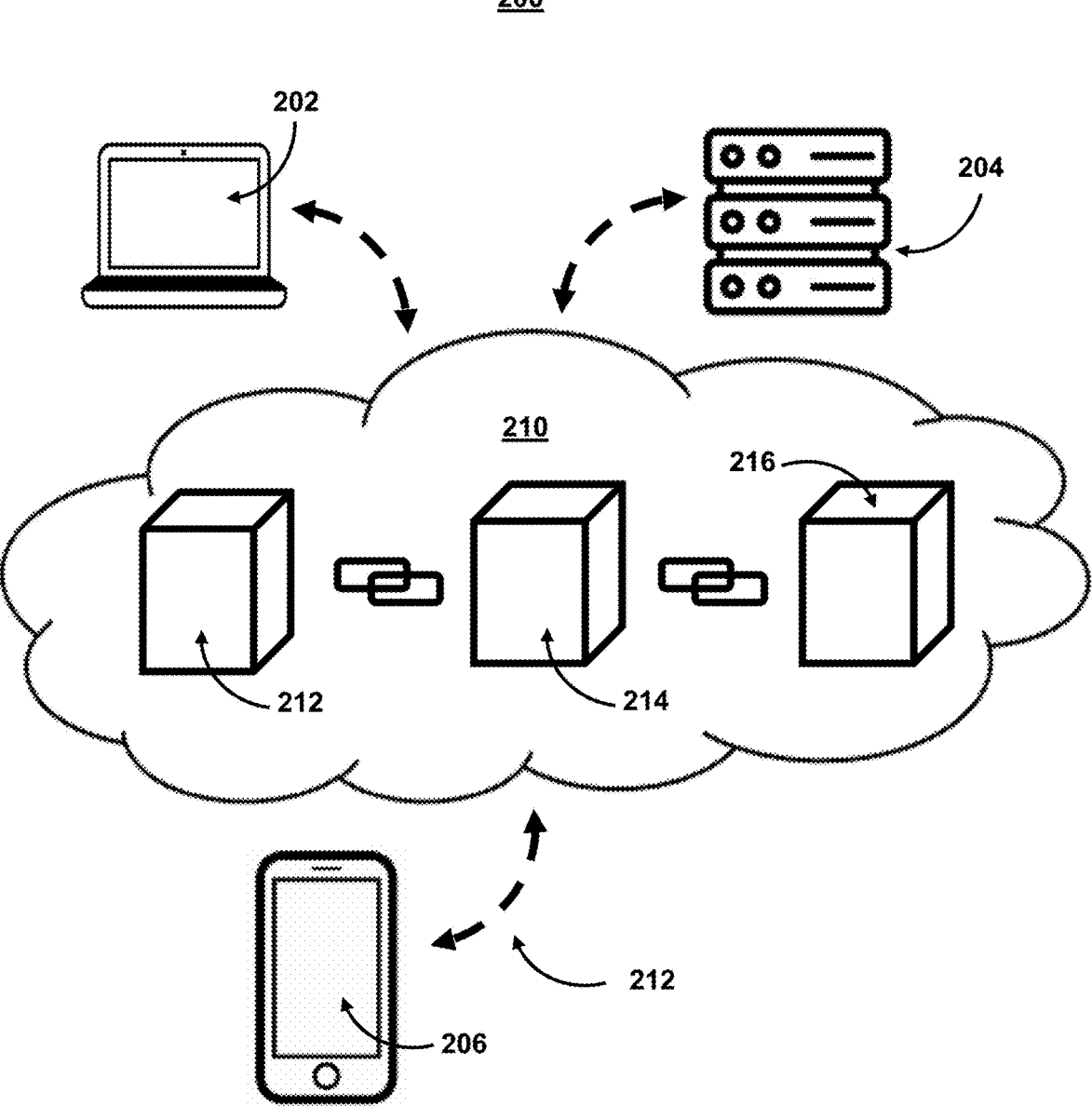
FIG. 2 shows an illustrative diagram for subnet operations, in accordance with one or more embodiments.

FIG. 2 shows an illustrative diagram of a blockchain network, in accordance with one or more embodiments. For example, system 200 may comprise a distributed state machine in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more clients, which behaves like an actual computer) for the system. The data structure may comprise one or more devices and/or components, which may act in concert to facilitate blockchain network 210.

As referred to herein, blockchain network 210 may comprise a type of distributed ledger technology that consists of a growing list of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214 but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain, with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain network 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally or alternatively, multiple users may interact with system 200 and/or one or more components of system 200. For example, in one embodiment, a first user and a second user may interact with system 200 using two different components (e.g., user device 204 and user device 206, respectively). Additionally or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to subnets within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 210, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
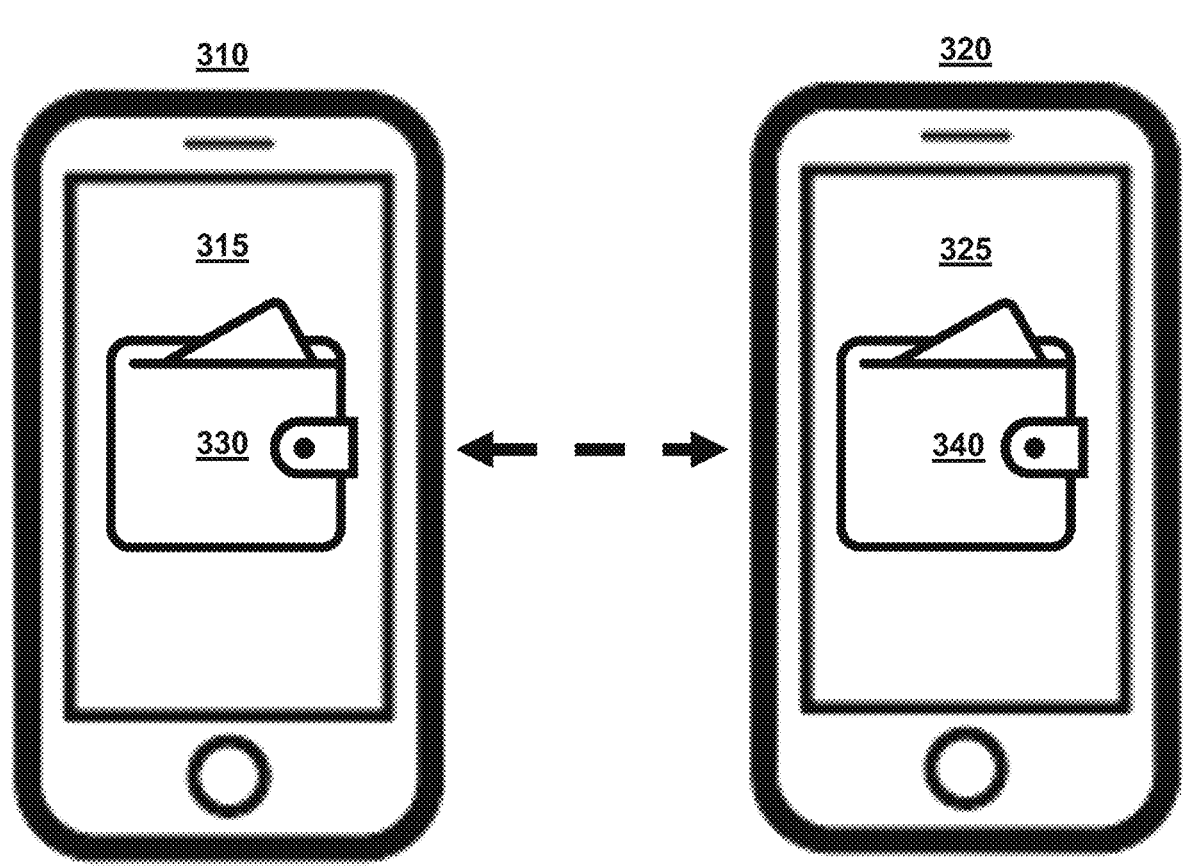
FIG. 3 shows illustrative components for a system used to perform blockchain actions in a double-layer restriction subnet architecture, in accordance with one or more embodiments.

FIG. 3 shows an illustrative diagram for conducting blockchain actions, in accordance with one or more embodiments. For example, the diagram presents various components that may be used to facilitate double-layer restriction subnet architectures using subnet specific restrictions in some embodiments. FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 32.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications. The API may provide various low-level and/or blockchain-specific operations in order to facilitate double-layer restriction subnet architectures using subnet specific restrictions. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages, including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall (WAF) that protects the decentralized applications and/or the API against common web exploits, bots, and denial-of-service (DDoS) attacks. The API may use RESTful APIs as standard for external integration.

In some embodiments, the system may also use one or more Application Binary Interfaces (ABIs) as an alternative to and/or in addition to an API. An ABI is an interface between two program modules, often between operating systems and user programs. ABIs may be specific to a blockchain protocol. For example, an ABI defines the methods and structures used to interact with the binary contract, similar to an API but on a lower level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets, such as hot wallets and cold wallets. Hot wallets are connected to the Internet, while cold wallets are not. Digital wallet holders may hold both a hot wallet and a cold wallet. Hot wallets are most often used to perform blockchain actions, while a cold wallet is generally used for managing a user account and may have no connection to the Internet.

In some embodiments, the cryptography-based, storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiments, a cryptography-based, storage application may include, or have access to, key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 310, user interface 315, and/or cryptography-based, storage application 330 may comprise, control, and/or have access to a private key and/or digital signature. For example, system 300 may use cryptographic systems for conducting blockchain actions, such as facilitating double-layer restriction subnet architectures using subnet specific restrictions. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain network 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action, and thus, this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain network 210 (FIG. 2)), and the blockchain action is completed. For example, to add the blockchain action to the blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network, such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allow blockchain actions to be conducted between the user devices without the need for any intermediaries or central authorities.

Figure 4:
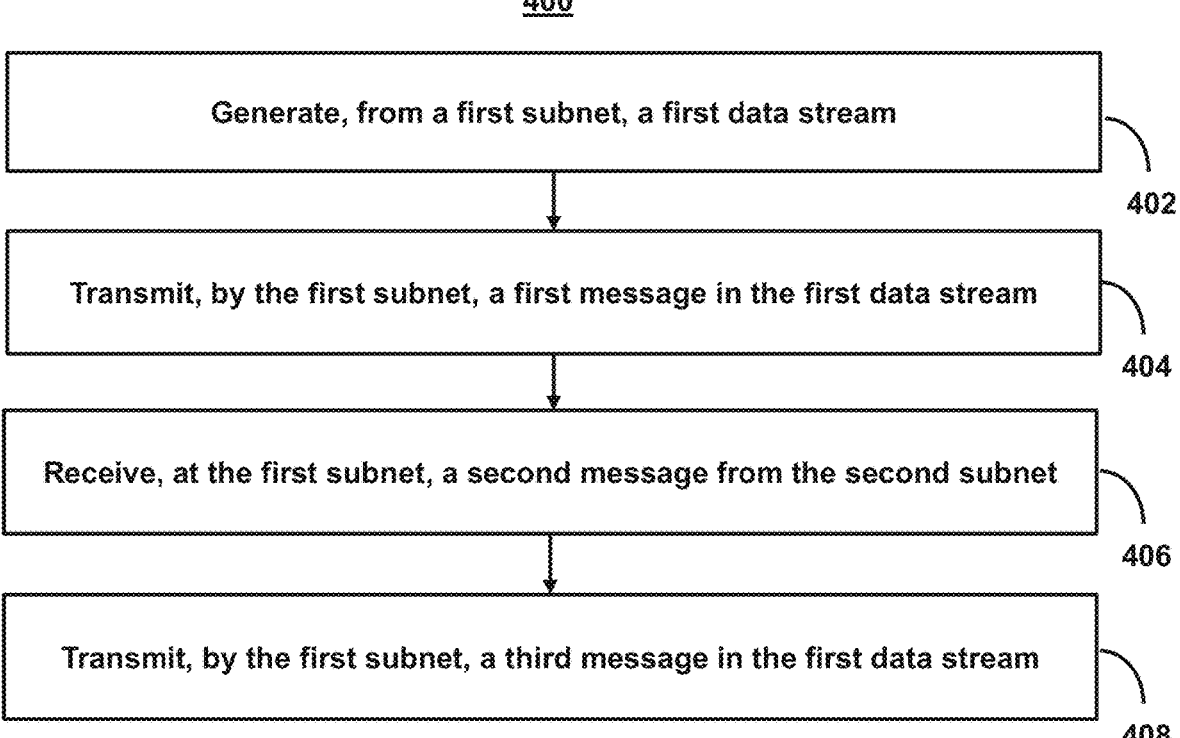
FIG. 4 shows a flowchart of the steps involved in facilitating double-layer restriction subnet architectures using subnet specific restrictions, in accordance with one or more embodiments.

FIG. 4 shows a flowchart of the steps involved in facilitating double-layer restriction subnet architectures using subnet specific restrictions, in accordance with one or more embodiments. For example, the system may use process 400 (e.g., as implemented on one or more system components described above) in order to facilitate subnet use. In some embodiments, process 400 may comprise a method for facilitating double-layer restriction subnet architectures using subnet, oracle, and/or other blockchain specific restrictions.

At step 402, process 400 (e.g., using one or more components described above) generates, from a first subnet, a first data stream. For example, the system may generate, from a first subnet, a first data stream, wherein the first subnet corresponds to a first level of a subnet hierarchy, wherein the first data stream is streamed to a first plurality of subnets at a second level of the subnet hierarchy, wherein the first data stream comprises a first data restriction, and wherein each subnet of the first plurality of subnets has a first restriction key, wherein the first restriction key is used to access data subject to the first data restriction. For example, as shown in FIG. 1A, subnet 104 may comprise an application that is hosted on a subnet, wherein only other entities/subnets that are authorized may access. The data on subnet 104 may enter subnet 104 encrypted (e.g., other than header data) with a key from a requestor. This ensures that only the specific requestor (e.g., corresponding to a specific subnet on a lower hierarchy) has access to data pertaining to the specific requests that the requestor submitted. This partitions data between requestors and ensures that no one else can see the data—even if they had access to subnet 104 and/or system 100.

For example, the system may configure the subnet by defining its IP address range, subnet mask, and any associated routing rules. The subnet mask determines which portion of the IP address identifies the network and which part identifies hosts within the subnet. Data is transmitted between devices within the same subnet by using the assigned IP addresses. When one device wants to send data to another device within the same subnet, it checks whether the destination IP address falls within the subnet's range.

If the destination IP address is within the subnet, the data is sent directly to the recipient device within the local subnet without needing to pass through a router or gateway. If a device in one subnet needs to communicate with a device in another subnet or with resources outside the local subnet (e.g., the Internet), routing mechanisms are used. This typically involves routing the data through a router or gateway device. The router examines the destination IP address of the data packet and determines the appropriate path to forward the data. If the destination is within the local subnet, the router forwards the data internally. If the destination is in another subnet, it routes the data to the appropriate subnet or external network. Devices within the same subnet can communicate with each other using broadcast traffic. Broadcasts are data packets sent to all devices within a subnet. Devices that need to respond to the broadcast will do so, while others ignore it. Broadcast traffic is generally limited within the subnet and does not propagate beyond its boundaries.

In some embodiments, the system may use permissioned blockchains. As such, the system may receive a request from the second subnet to join the subnet hierarchy. The system may determine an account corresponding to the second subnet. The system may determine that the account has access to the subnet hierarchy. The system may, in response to determining that the account has access to the subnet hierarchy, provide the first restriction key to the second subnet. The first restriction key may comprise a mechanism for accessing the permissioned blockchain. A permissioned blockchain grants access to participants based on a predefined set of rules, permissions, and identity verification mechanisms. Unlike public blockchains, where anyone can participate, permissioned blockchains are designed for known and trusted participants, such as organizations or individuals with specific roles and responsibilities (e.g., linked to a specific subnet).

In some embodiments, subnets in a permissioned blockchain network must first go through an identity verification process. This process involves providing proof of identity, which can include legal identification documents, organizational credentials, and other relevant information. Identity verification helps ensure that only authorized and trusted entities can join the network. Permissioned blockchains may use access control lists (ACLs) to define and manage permissions. An ACL specifies which participants or roles are allowed to perform specific actions on the blockchain, such as creating transactions, executing smart contracts, or accessing certain data. The highest level subnet in the subnet hierarchy may define these access control rules. The system may use RBAC to manage participants' permissions. RBAC assigns specific roles to participants, such as read-only users, validators, administrators, or other customized roles. Each role has a set of permissions associated with it, and participants are granted roles based on their responsibilities and trust levels. In some embodiments, access to the blockchain may be controlled through digital certificates. These certificates, issued by a Certificate Authority (CA), contain information about the participant's identity and public key. Subnets may use their private keys corresponding to their certificates to sign transactions and prove their identity on the blockchain. In some embodiments, the system may require subnets to be invited and approved by existing network members or administrators. This process ensures that only trusted entities are allowed to join the network. The consensus mechanism used in a permissioned blockchain can also play a role in access control. For example, in a consortium blockchain, only a predefined set of validators or nodes may be allowed to participate in the consensus process. Access to consensus participation may require additional permissions and identity verification. Additionally or alternatively, the system may have governance structures in place to manage changes to the network and participant membership. Governance decisions may involve adding or removing participants, changing permissions, and updating access control rules.

The restriction keys may comprise a variety of formats, and the formats may differ based on a level of the subnet hierarchy. For example, the system may use a permissioned blockchain access credential, encryption key, and/or other security protocol. A "permission blockchain access credential" may refer to a digital certificate or some form of authorization that grants a subnet (or an account linked to the subnet) permission to access and interact with a specific permissioned or private blockchain network. Permissioned blockchains are those in which participants must be explicitly granted access and have defined roles and permissions, unlike public blockchains, where anyone can participate. In many cases, access to a permissioned blockchain is controlled through digital certificates. These certificates are issued by a CA and contain information about the entity or user, as well as their public key. The certificates serve as a form of identification and authentication on the network. Permissioned blockchains may use public key infrastructure (PKI) to manage access credentials. PKI is a system of hardware, software, policies, and standards that work together to provide a secure framework for issuing and managing digital certificates and keys. Access credentials may also include information about the subnet's role within the blockchain network. RBAC is a common approach to managing permissions on a blockchain. Different roles may have different levels of access and authorization to perform specific actions on the blockchain. Along with the access credential, subnets may be required to have a corresponding private key. This private key is used to sign transactions, authenticate the user, and prove ownership of assets or data on the blockchain. The blockchain network will have authorization policies that specify which actions subnets with specific credentials can perform. These policies can be enforced by smart contracts or by the network's consensus mechanism.

Additionally or alternatively, the system may use an encryption key. An encryption key may be a piece of information, typically a string of bits or characters, used to transform plaintext (unencrypted data) into ciphertext (encrypted data) or to decrypt ciphertext back into plaintext. The length of an encryption key is measured in bits, and longer keys are generally considered more secure. The security of an encryption system often depends on the difficulty of breaking the encryption through techniques like brute-force attacks. Longer keys make these attacks exponentially more challenging. Accordingly, the system may select a length of the key based on a required security. In some embodiments, the encryption keys may be generated using a source of true randomness to ensure that they are unpredictable and resistant to cryptographic attacks. Pseudo-random number generators (PRNGs) may be used, but they must be seeded with sufficient entropy to provide randomness.

At step 404, process 400 (e.g., using one or more components described above) transmits, by the first subnet, a first message in the first data stream. For example, the system may transmit, by the first subnet, a first message in the first data stream, wherein first content of the first message is accessible, based on the first restriction key, to the second subnet and the third subnet. For example, data transmission within a subnet may be based on the principles of IP networking. When one device within the subnet wants to send data to another device within the same subnet, the sender subnet knows the destination device's IP address. The sender subnet constructs a data packet with the destination IP address, the source IP address, and the payload (the actual data to be transmitted). The sender subnet may check whether the destination IP address falls within the subnet's address range, as determined by the subnet mask. If the destination IP address is within the subnet's range, the sender subnet sends the data packet directly to the recipient device within the local subnet.

At step 406, process 400 (e.g., using one or more components described above) receives, at the first subnet, a second message from the second subnet. For example, the system may receive, at the first subnet, a second message from the second subnet, wherein the second message is received via a communication pathway separate from the first data stream. For example, the first subnet may receive data from the second subnet via another communication route. For example, the second subnet may establish a separate backchannel to the first subnet. The communication pathway may refer to a secondary channel of communication for the subnet hierarchy that exists alongside the primary or formal data stream. Each subnet may comprise a separate communication path that is specific to the second subnet. For example, the subnet hierarchy may have separate communication paths between each subnet in a given level of the hierarchy and a subnet on a higher level of the hierarchy. For example, as shown in FIG. 1B, requests that are filled are further sent to the specific subnet (e.g., subnet 104) of the supplier—encrypted with the supplier's key. This ensures that only the supplier can see the encrypted data—even if some other entity hacked its way onto the subnet. By doing so, the data is doubly protected—both on the requestor and on the supplier side.

In some embodiments, the system may access second content of the second message based on the second restriction key. The system may transmit a notification of a receipt of the second message in the first data stream, wherein the notification is published in the first data stream. For example, the system may publish notifications of any communications between the subnets in the subnet hierarchy. However, the notification may include data that is subject to one or more data restrictions. By doing so, other subnets in the hierarchy may determine that another subnet sent a communication, even though that subnet cannot decrypt the content of those communications.

In some embodiments, the system may participate in a key exchange. For example, when two subnets need to communicate securely, they often face the challenge of securely exchanging encryption keys. This is a critical aspect of cryptography, and various protocols and methods, such as Diffie-Hellman key exchange, are used to achieve this securely. For example, the system may determine an account corresponding to the second subnet. The system may then determine the second restriction key that is specific to the second subnet based on the account.

At step 408, process 400 (e.g., using one or more components described above) transmits, by the first subnet, a third message in the first data stream. For example, the system may transmit, by the first subnet, a third message in the first data stream, wherein the third message comprises the first data restriction and a second data restriction, wherein a second restriction key is specific to the second subnet, wherein the second restriction key is used to access data subject to the second data restriction, and wherein third content of the third message is accessible to the second subnet based on the second restriction key and is not accessible to the third subnet.

In some embodiments, the system may encrypt the third content of the third message to generate encrypted content. The system may transmit the encrypted content in the first data stream to the second subnet and the third subnet. For example, the system may encrypt data before transmission in a blockchain stream to protect sensitive information from unauthorized access by subnets besides a specific subnet to which the data is intended. For example, depending on the blockchain platform, the system may need to generate a digital signature for the data. The first subnet's private key may be used to sign the data or a hash of the data, depending on the specific requirements. To retrieve the encrypted data from the blockchain, subnets need to access the relevant transaction. The subnets can use the transaction's unique identifier (transaction ID or hash) to locate it on the blockchain. Once the encrypted data is retrieved, the recipient subnet may decrypt it using the appropriate decryption key (symmetric or private key, depending on the encryption method used).

In some embodiments, the system may execute a blockchain action using a cryptography-based, storage application. In some embodiments, the cryptography-based, storage application, which may be referred to as a digital wallet, e-wallet, and/or mobile wallet, is a software application or service that allows individuals to securely store, manage, and transact with various types of digital assets, including cryptocurrencies, digital payment methods, loyalty cards, and more.

To initiate a transaction, accounts (e.g., tied to a subnet) may download and install a digital wallet application or sign up for a wallet service provided by a financial institution or technology company. During the setup process, accounts may need to provide personal information, create a secure password or PIN, and set up security features such as two-factor authentication (2FA) or biometric authentication (e.g., fingerprint or facial recognition). The cryptography-based, storage application securely stores the account's digital assets in a digital format. Cryptocurrencies, for example, are stored as cryptographic private keys that grant access to the account's holdings on the respective blockchain network.

The cryptography-based, storage application may employ encryption and other security measures to protect the stored assets from unauthorized access. During blockchain actions, subnets can use their cryptography-based, storage applications to make payments or transactions. To send cryptocurrency to someone, cryptography-based, storage applications typically enter the recipient's wallet address and the amount they want to send. The wallet digitally signs the transaction with the cryptography-based, storage application's private key and broadcasts it to the blockchain network for validation. Subnets can link their credit/debit cards or mobile payment apps to the wallet and use it for online or in-store purchases.

Subnets can use the wallet to store and present digital loyalty cards or redeem digital coupons at participating retailers. Subnets can receive payments or digital assets by sharing their wallet address or QR code with the sender. For cryptocurrencies, the sender can initiate a transfer to the recipient's wallet address.

In some embodiments, the system may determine a time delay for receiving confirmations of blockchain actions. For example, the time it takes to accumulate confirmations depends on the blockchain's block generation time and the level of network congestion. In busier networks, blocks may be generated more frequently, leading to faster confirmations. Conversely, in less congested networks, confirmations may take longer. The system may account for this by adjusting a delivery time of the third message. By doing so, the notification confirming the blockchain action may confirm that the action occurred when the notification is sent.

In some embodiments, the system may determine a block requirement for a confirmation of a blockchain action being executed and determine a delivery time of the third message based on the block requirement, wherein the third content comprises a notification confirming the blockchain action. For example, a block requirement is a measure of how many blocks have been added to the blockchain after a particular transaction has been included in a block. Block confirmations provide a way to assess the security and finality of a transaction. For example, when a user initiates a transaction on a blockchain, it is broadcast to the network of nodes (computers) for validation. Once validated, the transaction is included in a block by a miner as part of the blockchain's ledger. The first confirmation occurs when the transaction is included in the next block added to the blockchain. At this point, it has one confirmation. As more blocks are added to the blockchain after the block containing the transaction, the number of confirmations increases. For each new block added, the transaction gains an additional confirmation. Each confirmation adds a layer of security to the transaction. The more confirmations a transaction has, the more difficult it becomes for a malicious actor to reverse or alter the transaction through a 51% attack or other means. While transactions are not immediately considered final upon inclusion in a block, as confirmations accumulate, the likelihood of a transaction being reversed decreases significantly. Many blockchain users and businesses require a certain number of confirmations to consider a transaction as final and irreversible. By waiting for a specific number of confirmations, the system can help mitigate the risk of double-spending attacks or other fraudulent activity. In some embodiments, the number of confirmations required for a transaction to be considered secure and final varies depending on the blockchain and the specific use case. For small or low-value transactions, one or a few confirmations may be sufficient. For larger transactions or those involving significant assets, more confirmations, often ranging from 6 to 12 or more, may be required.

In some embodiments, the system may determine a network requirement for a blockchain action being executed on the first cryptographically secure network. The system may determine the third content based on the network requirement. For example, the system may determine a gas fee for the blockchain action. The system may then determine the third content based on the network requirement.

To operate a blockchain exchange effectively and securely, certain network requirements must be met. These requirements ensure the exchange's performance, scalability, security, and availability. The system may adjust the content in a message (and/or send the message at all) based on the network requirement. For example, the system may set network requirements based on high-speed, low-latency network connectivity, which is crucial for real-time order execution and market data dissemination. Low-latency connections help reduce the risk of arbitrage opportunities and provide a better user experience. The system may require redundant Internet connections from multiple Internet service providers (ISPs), which are essential to ensure uptime and prevent network disruptions. In the event of an ISP outage, redundant connections can maintain service availability.

The system may require Distributed Denial of Service (DDoS) attack prevention measures. Implementing DDoS mitigation solutions and services can help protect against these attacks, ensuring the exchange remains accessible during an attack. The system may require strong security protocols, including firewalls, intrusion detection and prevention systems (IDS/IPS), and data encryption, which are critical for protecting user data, funds, and the exchange's infrastructure.

Implementing a WAF can help safeguard against web-based attacks. The system may require DDoS traffic scrubbing services that can be used to filter out malicious traffic during a DDoS attack, allowing legitimate traffic to reach the exchange. The system may require segmentation of network traffic, especially between the exchange's trading platform and its management systems, which can help prevent unauthorized access to critical infrastructure. The system may require employing redundant servers and load balancing solutions, which ensures that the exchange can handle high levels of traffic and provide high availability. Load balancers distribute incoming traffic across multiple servers, improving response times and fault tolerance.

In some embodiments, the system may transmit a message in a data stream by publishing it to a cryptographically secure network (e.g., blockchain) provided by the subnet. For example, publishing content to a blockchain involves creating a transaction that includes the content data as part of the transaction's payload. To do so, the system may select a blockchain platform that supports self-executing programs and/or custom data storage. To interact with the blockchain, the system may access a cryptography-based, storage application (e.g., a digital wallet). The application may contain a private key that is kept secure. This private key is used to sign transactions and prove ownership of assets on the blockchain. The system may then convert the content to be published into a suitable digital format. This might involve encoding text, images, videos, or other data into a format that can be included in a blockchain transaction. The system may then use a blockchain client or software development kit (SDK) to create a transaction. This transaction will include implementation details such as the recipient's address (e.g., an address of a self-executing program or an account where the system wants to store the content), data (e.g., the actual content data is included in the transaction's data field, which may be in raw binary form or encoded in a specific format), and gas (e.g., a transaction fee in cryptocurrency to execute the transaction and store data on the blockchain). The system may also use its digital wallet's private key to sign the transaction. This step proves that the system is the sender and authorizes the transaction. The system may then broadcast the signed transaction to the blockchain network. Miners or validators on the network will receive and process the transaction, including the content data. The transaction may go through a confirmation process, during which miners validate it and include it in a block. Once included in a block, the content becomes part of the blockchain's immutable history. To access the content, the system (e.g., comprising one or more subnets) can use the blockchain's data retrieval mechanisms. This may involve calling a self-executing program method, referencing a transaction hash, or using other blockchain-specific techniques. The system may then retrieve the content data from the blockchain and decode it into a usable format. This step varies depending on the type of content and how it was encoded in the transaction.

In some embodiments, the system may need to modify existing bytecode. For example, the system may receive content or a portion of content (e.g., a self-executing program, digital record, etc.) that is already compiled. Modifying pre-compiled bytecode, such as bytecode for Java classes or Python scripts, can be a complex and potentially risky task, as tampering with bytecode can lead to unexpected behavior, errors, or even security vulnerabilities. To do so, the system may first identify the format of the bytecode in the content. Different programming languages and platforms have their own bytecode formats. For example, Java uses Java bytecode (.class files), Python uses Python bytecode (.pyc files), and .NET uses Common Intermediate Language (CIL) bytecode (.dll and .exe files). The system may then select a decompiler. Decompilers are tools that can reverse-engineer bytecode back into a higher-level programming language or pseudo-code. This can help the system understand the structure of the bytecode and make modifications more manageable. For Java, tools like JD-GUI, FernFlower, or CFR can be used. For Python, you can use decompilers like uncompyle6 or uncompyle2.

Once the system decompiles the bytecode, the system can make the desired modifications to the source code representation. This could involve fixing a bug, adding a feature, or making any other necessary changes. After making modifications, the system needs to recompile the code back into bytecode. This step can be challenging because the system needs to ensure that the bytecode structure remains compatible with the original runtime environment. Some languages, like Python, might not provide straightforward tools for recompilation. In such cases, the system may need to create a new script or use a tool like Cython to generate new bytecode. The system may then test the new bytecode. Testing is crucial to ensure that the modified bytecode behaves as expected and does not introduce any new issues. The system may then use the new bytecode (e.g., to generate a self-executing program, digital record, etc.).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for facilitating double-layer restriction subnet architectures using subnet, oracle, and/or other blockchain specific restrictions.
2. The method of any one of the preceding embodiments, further comprising: establishing a subnet hierarchy comprising a first subnet, a second subnet, and a third subnet, wherein the first subnet is located at a first level of the subnet hierarchy, wherein the second subnet and the third subnet are located at a second level of the subnet hierarchy, wherein the first subnet streams a first data stream that is subject to a first data restriction to the second subnet and the third subnet, and wherein the first data stream is interpretable to subnets located at the second level; simultaneously streaming, by the first subnet, a first message in the first data stream to the second subnet and the third subnet; receiving, at the first subnet, a second message from the second subnet, wherein the second message is subject to a second data restriction, wherein the second message is interpretable by the first subnet, and wherein the second message is received via a communication pathway that is separate from the first data stream and specific to the second subnet; and simultaneously streaming, by the first subnet, a third message in the first data stream to the second subnet and the third subnet, wherein the third message is further subject to the second data restriction, wherein the third message is interpretable by the second subnet, and wherein the third message is not interpretable by the third subnet.

3. The method of any one of the preceding embodiments, further comprising: generating, from a first subnet, a first data stream, wherein the first subnet corresponds to a first level of a subnet hierarchy, wherein the first data stream is streamed to a first plurality of subnets at a second level of the subnet hierarchy, wherein the first data stream comprises a first data restriction, and wherein each subnet of the first plurality of subnets has a first restriction key, wherein the first restriction key is used to access data subject to the first data restriction; transmitting, by the first subnet, a first message in the first data stream, wherein first content of the first message is accessible, based on the first restriction key, to the second subnet and the third subnet; receiving, at the first subnet, a second message from the second subnet, wherein the second message is received via a communication pathway separate from the first data stream; and transmitting, by the first subnet, a third message in the first data stream, wherein the third message comprises the first data restriction and a second data restriction, wherein a second restriction key is specific to the second subnet, wherein the second restriction key is used to access data subject to the second data restriction, and wherein third content of the third message is accessible to the second subnet based on the second restriction key and is not accessible to the third subnet.

4. The method of any one of the preceding embodiments, wherein receiving, at the first subnet, the second message from the second subnet further comprises: accessing second content of the second message based on the second restriction key; and transmitting a notification of a receipt of the second message in the first data stream, wherein the notification is published in the first data stream.

5. The method of any one of the preceding embodiments, wherein transmitting the third message in the first data stream further comprises: encrypting the third content of the third message to generate encrypted content; and transmitting the encrypted content in the first data stream to the second subnet and the third subnet.

6. The method of any one of the preceding embodiments, wherein transmitting, by the first subnet, the third message in the first data stream further comprises publishing encrypted data to a permissioned blockchain.

7. The method of any one of the preceding embodiments, wherein transmitting, by the first subnet, the third message in the first data stream further comprises: transmitting, to the second subnet, a notification confirming a blockchain action in the third content of the third message; and executing the blockchain action using a cryptography-based, storage application corresponding to the second subnet.

8. The method of any one of the preceding embodiments, wherein transmitting, by the first subnet, the third message in the first data stream further comprises: determining a time delay for receiving a confirmation of a blockchain action being executed; and determining a delivery time of the third message based on the time delay, wherein the third content comprises a notification confirming the blockchain action.

9. The method of any one of the preceding embodiments, wherein transmitting, by the first subnet, the third message in the first data stream further comprises: determining a block requirement for a confirmation of a blockchain action being executed; and determining a delivery time of the third message based on the block requirement, wherein the third content comprises a notification confirming the blockchain action.

10. The method of any one of the preceding embodiments, wherein transmitting, by the first subnet, the third message in the first data stream further comprises: determining a network requirement for a blockchain action being executed on the first cryptographically secure network; and determining the third content based on the network requirement.

11. The method of any one of the preceding embodiments, further comprising: receiving a request from the second subnet to join the subnet hierarchy; determining an account corresponding to the second subnet; determining that the account has access to the subnet hierarchy; and in response to determining that the account has access to the subnet hierarchy, providing the first restriction key to the second subnet.

12. The method of any one of the preceding embodiments, further comprising: determining an account corresponding to the second subnet; and determining the second restriction key that is specific to the second subnet based on the account.

13. The method of any one of the preceding embodiments, wherein the first restriction key comprises a permissioned blockchain access credential, and wherein the second restriction key comprises an encryption key.

14. The method of any one of the preceding embodiments, wherein transmitting the first message in the first data stream further comprises: generating a record for a first cryptographically secure network; and publishing the record on the first cryptographically secure network.

15. The method of any one of the preceding embodiments, wherein accessing the third content by the second subnet comprises: determining a bytecode format of the third message; selecting a decompiler based on the bytecode format; decompiling the third content using the decompiler; and decrypting the third content using the second restriction key.

16. A tangible, non-transitory, computer-readable medium storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

US 12,676,840 B2

27

What is claimed is:

1. A system for facilitating double-layer restriction subnet architectures using subnet specific restrictions, the system comprising:

one or more processors; and one or more non-transitory, computer-readable mediums comprising instructions that, when executed by the one or more processors, cause operations comprising:

establishing a subnet hierarchy comprising a first subnet, a second subnet, and a third subnet, wherein the first subnet is located at a first level of the subnet hierarchy, wherein the second subnet and the third subnet are located at a second level of the subnet hierarchy, wherein the first subnet streams a first data stream that is subject to a first data restriction to the second subnet and the third subnet, and wherein the first data restriction comprises a first encryption based on a public key for the first subnet such that the first data stream is decryptable with a second subnet's private key and a third subnet's private key;

simultaneously streaming, by the first subnet, a first message in the first data stream to the second subnet and the third subnet;

receiving, at the first subnet, a second message from the second subnet, wherein the second message is subject to a second data restriction, wherein the second message is interpretable by the first subnet, wherein the second message is received via a communication pathway that is separate from the first data stream and specific to the second subnet, and wherein the second data restriction comprises a second encryption based on a second public key for the first subnet such that a second data stream is decryptable with the second subnet's private key; and simultaneously streaming, by the first subnet, a third message in the first data stream to the second subnet and the third subnet, wherein the third message is further subject to the second data restriction.

2. A method for facilitating double-layer restriction subnet architectures using subnet specific restrictions, the method comprising:

transmitting, by a first subnet of a subnet hierarchy, a first message, wherein the first message comprises a first data restriction, and wherein the first data restriction comprises a first encryption for the first subnet, and wherein the first encryption is based on a first public key for the first subnet;

receiving, at the first subnet, a second message from a second subnet of the subnet hierarchy in response to the second subnet accessing the first message using a permissioned blockchain access credential; and transmitting, by the first subnet, a third message, wherein the third message comprises the first data restriction and a second data restriction, wherein the second data restriction comprises a second encryption based on a second public key for the first subnet, and wherein a second restriction key is a private encryption key specific to the second subnet.

3. The method of claim 2, wherein receiving, at the first subnet, the second message from the second subnet further comprises:

accessing second content of the second message based on the second restriction key; and transmitting a notification of a receipt of the second message in a first data stream, wherein the notification is published in the first data stream.

4. The method of claim 2, wherein transmitting the third message further comprises:

encrypting a third content of the third message to generate encrypted content; and transmitting the encrypted content to the second subnet and a third subnet of the subnet hierarchy.

5. The method of claim 2, wherein transmitting, by the first subnet, the third message further comprises publishing encrypted data to a permissioned blockchain.

6. The method of claim 2, wherein transmitting, by the first subnet, the third message further comprises:

transmitting, to the second subnet, a notification confirming a blockchain action in a third content of the third message; and executing the blockchain action using a cryptography-based, storage application corresponding to the second subnet.

7. The method of claim 2, wherein transmitting, by the first subnet, the third message further comprises:

determining a time delay for receiving a confirmation of a blockchain action being executed; and determining a delivery time of the third message based on the time delay, wherein a third content comprises a notification confirming the blockchain action.

8. The method of claim 2, wherein transmitting, by the first subnet, the third message further comprises:

determining a block requirement for a confirmation of a blockchain action being executed; and determining a delivery time of the third message based on the block requirement, wherein a third content comprises a notification confirming the blockchain action.

9. The method of claim 2, wherein transmitting, by the first subnet, the third message further comprises:

determining a network requirement for a blockchain action being executed on a first cryptographically secure network; and determining a third content based on the network requirement.

10. The method of claim 2, further comprising:

receiving a request from the second subnet to join the subnet hierarchy;

determining an account corresponding to the second subnet;

determining that the account has access to the subnet hierarchy; and in response to determining that the account has access to the subnet hierarchy, providing a first restriction key to the second subnet.

11. The method of claim 2, further comprising:

determining an account corresponding to the second subnet; and determining the second restriction key that is specific to the second subnet based on the account.

12. The method of claim 2, further comprising generating, from the first subnet, a first data stream, wherein the first subnet corresponds to a first level of the subnet hierarchy, and wherein the first data stream is streamed to a first plurality of subnets at a second level of the subnet hierarchy.

13. The method of claim 2, wherein transmitting the first message further comprises:

generating a record for a first cryptographically secure network; and publishing the record on the first cryptographically secure network.

14. The method of claim 2, further comprising:
determining a bytecode format of the third message;
selecting a decompiler based on the bytecode format;
decompiling a third content using the decompiler; and
decrypting the third content using the second restriction
key.

15. One or more non-transitory, computer-readable mediums comprising instructions that, when executed by one or more processors, cause operations comprising:

transmitting, by a first oracle of an oracle hierarchy, a first message in a first data stream, wherein the first data stream comprises a first data restriction, and wherein the first data restriction comprises a first encryption for the first oracle based on a first public key for a first subnet;

receiving, at the first oracle, a second message from a second oracle of the oracle hierarchy in response to the second oracle accessing the first message using a permissioned blockchain access credential; and transmitting, by the first oracle, a third message, wherein the third message comprises the first data restriction and a second data restriction, wherein the second data restriction comprises a second encryption based on a second public key for the first oracle, and wherein a second restriction key is a private encryption key specific to the second oracle.

16. The one or more non-transitory, computer-readable mediums of claim 15, wherein receiving, at the first oracle, the second message from the second oracle further comprises:

accessing second content of the second message based on the second restriction key; and transmitting a notification of a receipt of the second message.

17. The one or more non-transitory, computer-readable mediums of claim 15, wherein transmitting the third message in the first data stream further comprises:

encrypting a third content of the third message to generate encrypted content; and transmitting the encrypted content in the first data stream to the second oracle and a third oracle.

18. The one or more non-transitory, computer-readable mediums of claim 15, wherein transmitting, by the first oracle, the third message further comprises publishing encrypted data to a permissioned blockchain.

19. The one or more non-transitory, computer-readable mediums of claim 15, wherein transmitting, by the first oracle, the third message in the first data stream further comprises:

transmitting, to the second oracle, a notification confirming a blockchain action in a third content of the third message; and executing the blockchain action using a cryptography-based, storage application corresponding to the second oracle.

20. The one or more non-transitory, computer-readable mediums of claim 15, further comprising:

receiving a request from the second oracle to join the oracle hierarchy;

determining an account corresponding to the second oracle;

determining that the account has access to the oracle hierarchy; and in response to determining that the account has access to the oracle hierarchy, providing a first restriction key to the second oracle.

* * * * *